Aug. 22, 1961     J. W. MAY     2,997,071
PIPE SYSTEMS
Filed Oct. 9, 1957     2 Sheets-Sheet 2
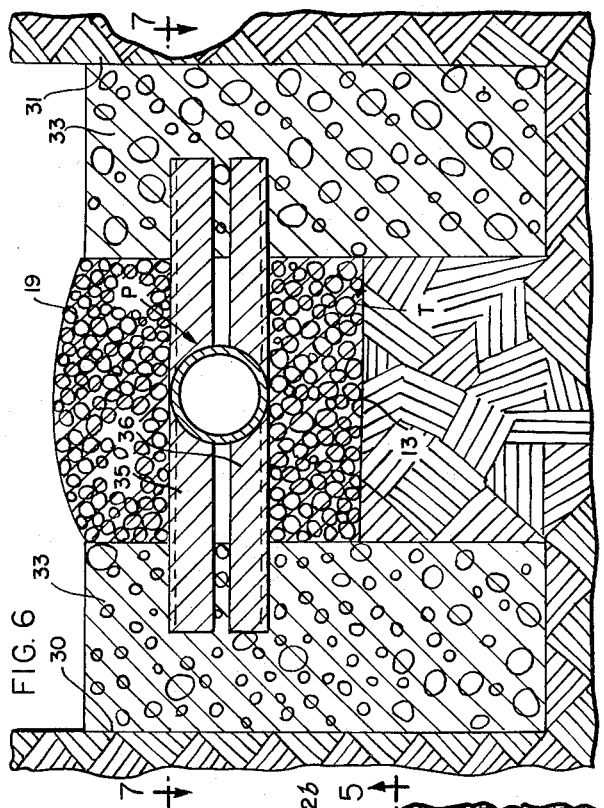
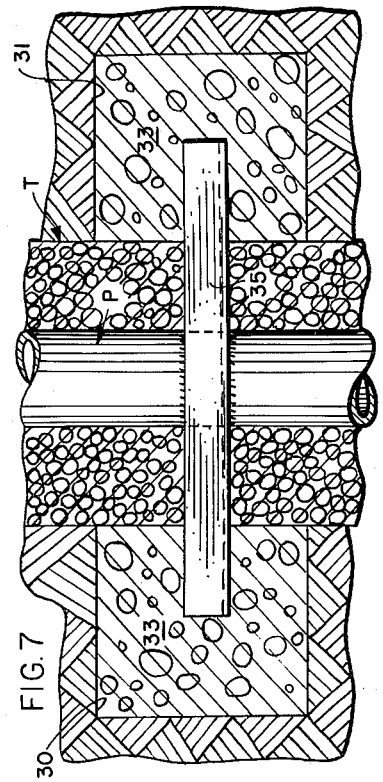
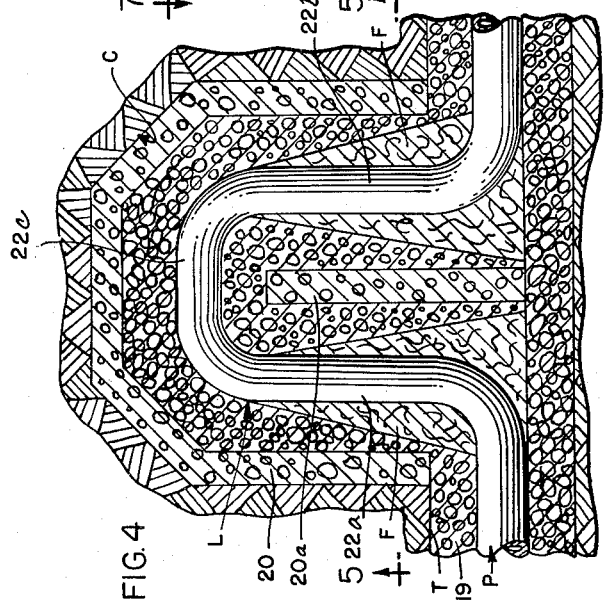
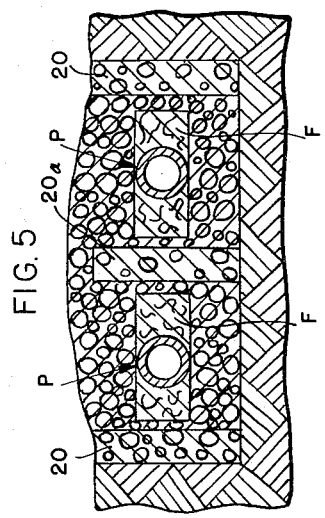
INVENTOR:
JOHN W. MAY
BY
ATT'YS

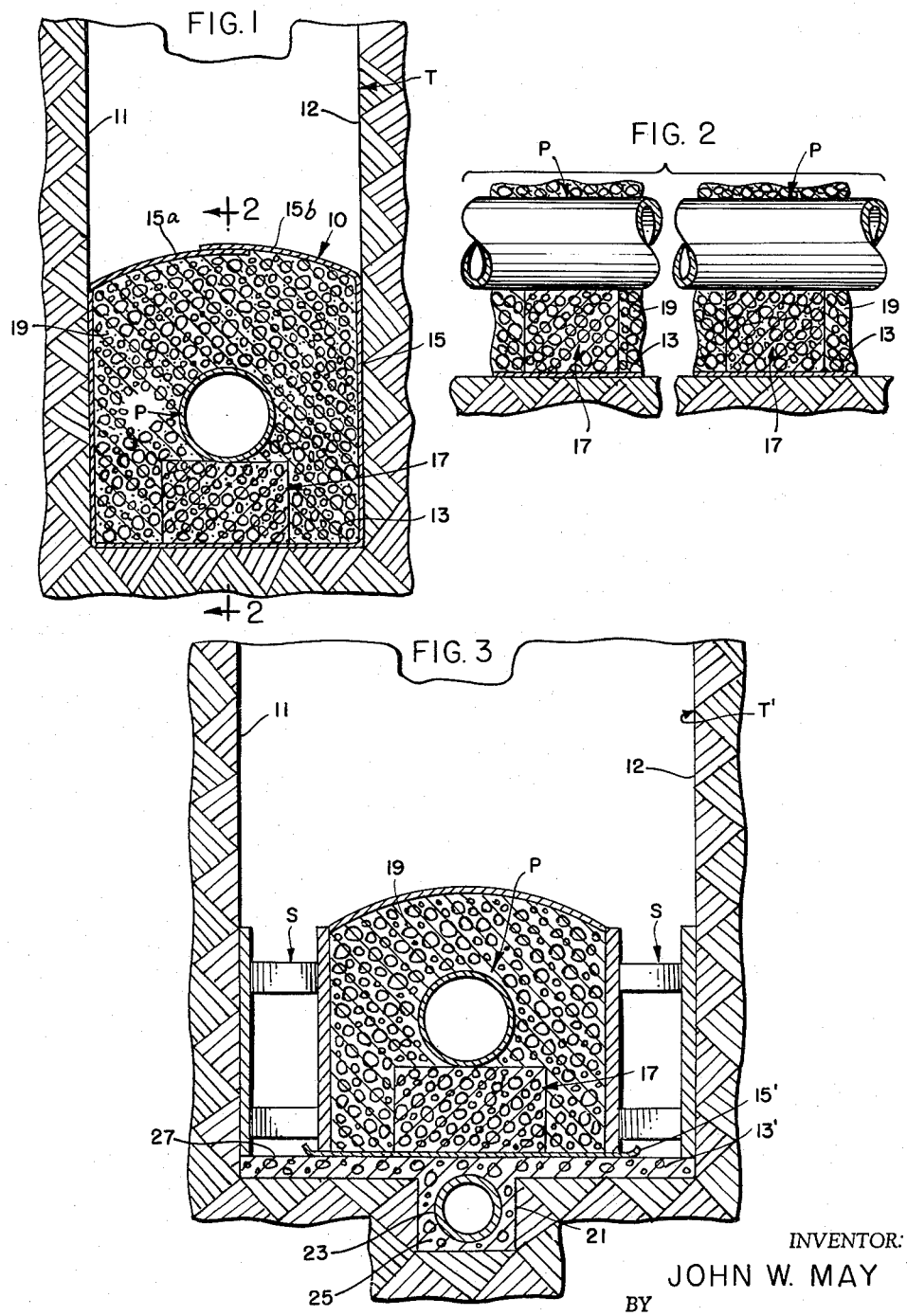

United States Patent Office 2,997,071
Patented Aug. 22, 1961

2,997,071
PIPE SYSTEMS
John W. May, 123 Lipton St., Winnipeg 10,
Manitoba, Canada
Filed Oct. 9, 1957, Ser. No. 689,226
7 Claims. (Cl. 138—105)

This invention relates to pipe systems and, more particularly, to pipe systems which are particularly well adapted for use as either underground or above-ground insulated pipe systems.

It is a primary object of my invention to enable a novel underground or above-ground insulated pipe system to be afforded.

Underground or above-ground pipe systems for the transmission of working fluids used in heating systems and the like have been heretofore known in the art. However, such systems as have been heretofore known have had several inherent disadvantages such as, for example, being expensive or difficult to construct; being complicated in construction; being inefficient in operation; embodying extensive special foundations or slabs or other undesirable or relatively expensive supporting structures, or the like. It is another object of my invention to overcome such inherent disadvantages.

Another object of my invention is to enable a novel heat-insulated pipe system to be afforded which is efficient in operation and which may be readily and economically constructed.

Yet another object of my invention is to afford a novel pipe system of the aforementioned type which is effectively insulated in a novel and expeditious manner.

A further object of my invention is to afford a novel combination support and insulation for pipes in such a pipe system.

An object ancillary to the foregoing is to afford a novel support and insulation for such pipes which comprises novel concrete embodying expanded perlite as a substantial part thereof.

Another object of my invention is to enable elongated pipes to be supported in elongated trenches in a novel and expeditious manner.

Yet another object is to enable the work necessary to support and insulate pipes in an underground insulated pipe system to be quickly and economically accomplished.

A further object of my invention is to enable expansion and contraction loops for such a pipe system to be supported in a novel and expeditious manner.

An object ancillary to the foregoing is to afford a novel resilient insulating construction for such loops.

A further object of my invention is to enable pipes of pipe systems of the aforementioned type to be anchored in a trench in a novel and expeditious manner.

Other and further objects of the present invention will be apparent from the following description and claims and are illustrated in the accompany drawings which, by way of illustration, show the preferred embodiments of the present invention and the principles thereof and what I now consider to be the best modes in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a transverse sectional view through a trench embodying a pipe system embodying the principles of my invention;

FIG. 2 is a fragmentary longitudinal sectional view taken substantially along the line 2—2 in FIG. 1;

FIG. 3 is a transverse sectional view similar to FIG. 1, but showing a modified form of my invention.

FIG. 4 is a horizontal longitudinal sectional view through another portion of the trench shown in FIG. 1, and showing an expansion loop for the pipe system therein;

FIG. 5 is a sectional view taken substantially along the line 5—5 in FIG. 4;

FIG. 6 is a transverse sectional view similar to FIG. 1, but showing another modified form of my invention; and FIG. 7 is a detail sectional view taken substantially along the line 7—7 in FIG. 6.

In FIGS. 1, 2, 4 and 5 an underground heat-insulated pipe system 10 embodying the principles of my invention is shown to illustrate the preferred embodiment of my invention.

In the pipe system 10, shown in the drawings, an elongated pipe P is mounted in and insulated in an elongated trench T, which has been dug in the ground and preferably embodies straight vertical side walls 11 and 12, and a flat bottom wall 13. The pipe P is supported in the trench T in spaced relation to the walls 11—13, as will be discussed in greater detail presently, and extends longitudinally along the trench T.

Periodically along the length thereof, the trench T embodies an enlarged chamber C, FIGS. 4 and 5, which projects horizontally outwardly from the main body portion of the trench T, perpendicularly to the length of the latter. The chambers C are preferably the same depth as the main body portion of the trench T and afford chambers in which expansion and contraction loops L on the pipe P may be disposed and supported in a novel manner as will be discussed in greater detail presently.

In the construction of my novel pipe system as shown in FIGS. 1, 2, 4 and 5, the trench T may be dug with chambrs C afford at proper intervals along the length thereof. The bottom wall 13 of the trench T may then be covered by a suitable waterproof sheet material such as, for example, roofing paper, tar paper, asphalt paper, or the like, with the edges of the paper extended upwardly along the side walls 11 and 12 of the trench T. In the practice of my invention, a plurality of rectangular-shaped heat-insulating concrete blocks 17 may be mounted on the layer of paper 15 on the bottom wall 13 of the trench T, with the blocks centrally disposed between the side walls 11 and 12, and with the lengths thereof extending perpendicularly to the length of the trench T.

The blocks 17 afford the supporting members on which the pipe P is initially supported in the trench T in the construction of my novel piping system, and they are spaced along the trench T at suitable distances such that when the pipe P is laid thereon, it will be supported by the blocks 17 without any undesirable sagging. In most instances, the blocks 17 may be spaced from each other a considerable distance, such as, for example, 10 feet, and still afford the desired support for the pipe P.

After the pipe P has been laid onto the blocks 17 in the trench T, heat-insulating concrete 19 may be poured into the trench T all along the length thereof, between the chambers C, to a depth sufficient to cover the pipe P with the heat-insulating concrete 19 to a predetermined minimum thickness in all directions as will be discussed in greater detail presently. The top of the concrete 19 is preferably rounded off into an arcuate shape, as shown in FIG. 1, and after the concrete 19 has set, the upper edge portions 15a and 15b of the sheet material 15 may be folded inwardly over the top of the concrete 19 into overlapping relation to each other and sealed together in such position to thereby afford a waterproof sleeve around the heat-insulating concrete 19.

In making the concrete blocks 17 and the concrete 19, in accordance with my invention, perlite is used as the aggregate thereof. Perlite, in its crude form is a volcanic rock which, when heated quickly to a suitable point in its softening range, expands to form a light weight noncombustible glass-like material of cellular structure known as perlite. Crude perlite has an average bulk density of 85 lbs. per cubic foot. Expanded perlite, because of the myriad cells in each particle, weighs from seven and one-half pounds to ten pounds per cubic foot.

In making the heat-insulating concrete blocks 17 and the heat-insulating concrete 19, I prefer to use a concrete mix which consists only of clean water, Portland cement, a suitable air entraining agent, and expanded perlite. The mix which I prefer to use for this purpose, and which I have found gives the best results consists of the following:

| | | |
|---|---|---|
| Clean water | gallons | 20 |
| Portland cement | cubic feet | 1 |
| Neutralized Vinsol resin (7½% solution) | pints | 2 |
| Expanded perlite | cubic feet | 8 |

The physical constants of a satisfactory resin for use as an air entraining agent in the above mentioned mix are as follows:

| | | |
|---|---|---|
| Melting point (drop method) | °C | 115 |
| Acid number | | 93 |
| Gasoline-soluble matter | percent | 12 |
| Toluene-insoluble matter | percent | 20 |

Such a resin may be obtained on the market under the trade name of "Vinsol."

The acidity of the resin may be partially neutralized by esterification with a polyhydric alcohol, such as glycerin, erythritol, pentaerythritol or the like.

In mixing the above mentioned concrete, the water, Portland cement and resin are preferably first placed in a suitable concrete mixer, or the like, and mixed for approximately one minute, until a slurry is formed. Then, while the mixing continues, the expanded perlite is added to the mixture and the mixing is continued for approximately one more minute until a concrete mixture of good pouring texture is afforded. The mix may then be immediately poured either into the trench T, to afford the concrete 19, or into suitable forms, not shown, to afford the blocks 17. After the concrete thus afforded has set, it affords a highly effective and practical heat-insulation and support for pipes used in the underground pipe systems, and the like.

The ratio of expanded perlite to Portland cement may be varied somewhat in the above mentioned mix. However, I have found that, if less than five cubic feet, or more than nine cubic feet, of expanded perlite are used per each cubic foot of Portland cement in the above mentioned mix, the concrete afforded thereby does not afford heat-insulating and supporting concrete of the type desired in the practice of my invention.

When a single pipe P is used in my novel pipe system, I prefer to use blocks 17 having a total length of not less than two inches more than the diameter of the pipe, and which have a minimum height and width of six inches for use with pipes P having a diameter of six inches or less. For pipes P having a diameter greater than six inches, I prefer to use blocks 17 having a minimum width and height of eight inches, and, as previously mentioned, a length of not less than two inches more than the diameter of the pipe.

Thus, it will be seen that for supporting a pipe P having a diameter of six inches, I prefer to use blocks 17 which have a length of eight inches, and have a width and height of six inches.

Also, in pipe systems embodying my novel invention, wherein pipes having a diameter of six inches or less are used, I prefer that the concrete 19 be of such width and height that a minimum thickness of six inches of the concrete 19 is afforded around the pipe P in all directions. In pipe systems wherein the pipe P is greater than six inches in diameter, I prefer that the concrete 19 be of such dimensions that the pipe P is covered by the concrete 19 to a minimum thickness of eight inches around the pipe P in all directions.

In addition, in the construction and installation of my novel pipe system, in areas where it will have normal traffic thereover, I prefer that the top of the heat-insulating concrete 19 be disposed a minimum distance of two feet below the surface of the ground for ordinary traffic conditions. Thus, in the construction of a pipe system embodying my novel invention, and including a pipe six inches in diameter, the trench T would preferably be a minimum of three and one-half feet in depth so as to provide a depth which would afford space for a block 17 six inches in height, a pipe P, six inches in diameter, a six inch covering of concrete 19 over the pipe P, and two feet of covering over the top of the concrete 19. Such a trench T would also preferably have a minimum width of eighteen inches so as to afford a width which would afford space for a pipe P of six inch diameter, and six inches of heat-insulating concrete 19 on both sides of the pipe P.

Although I normally prefer to dispose my novel pipe system in a trench of such dimensions that the top of the concrete 19 is disposed two feet below the surface of the ground, it will be appreciated by those skilled in that art that this is merely by way of illustration and not by way of limitation, and that trenches of greater or lesser depth may be used without departing from the purview of my invention. The heat-insulation afforded by my novel concrete 19 and blocks 17 is so efficient that it affords highly efficient heat-insulation for the pipe P even when it is directly exposed to high and low temperature weather conditions.

The pipe P, before it is placed in the trench T is preferably coated with lubricating oil or grease so that the concrete 19, when poured thereon, will not adhere thereto. This enables any longitudinal contraction or expansion of the pipe P to freely take place through the concrete 19.

In most instances, in the construction of a pipe system such as the pipe system 10, special provisions should be made for permitting longitudinal expansion and contraction of the pipe P. Normally, I prefer to provide for such expansion and contraction by providing expansion loops periodically along the length of the pipe P. In accordance with the principles of my invention, I prefer to afford the expansion and contraction loops in my novel pipe system 10, in the manner shown in FIGS. 4 and 5, wherein a horizontally extending expansion and contraction loop L is shown disposed in a chamber C which projects horizontally outwardly from the main body portion of the trench T. The chamber C is dug to the same depth as the main body portion of the trench T and the side walls thereof are preferably lined with a suitable concrete reinforcing wall 20. After the reinforcing wall 20 has been poured, a slab 20a of structural concrete may be disposed in upright position from the bottom of the chamber C, midway between the side walls thereof and perpendicularly to the length of the main body portion of the trench T, to afford a partition wall, FIGS. 4 and 5. The pipe P, with the expansion loop L therein, may be disposed in the trench T and supported on blocks 17, as previously discussed, with the legs 22a and 22b of the loop L disposed on opposite sides of the partition wall 20a in spaced relation thereto, and with the bight 22c of the loop L disposed between, and in spaced relation to, the end of the partition wall 20a and the closed end of the chamber C, FIG. 4.

Thereafter, a quantity of resilient packing F, in the form of fine, flexible glass fibers made by attenuating molten glass streams flowing from small holes, and known in the trade as fiber-glass, may be packed around each of the legs 22a and 22b between the junction thereof with the bight 22c and with the main body portion of the pipe P. The fiber-glass is preferably packed on the legs 22a and 22b in a substantially horizontally extending wedge-shape, tapering from a width of approximately one inch on each side of the pipe P, at the junction of the legs 22a and 22b with the bight 22c, to a preferred width of not less than approximately nine inches on each side of the pipe P, at the junction of the legs 22a and 22b with the main body portions of the pipe P, FIG. 4, the exact width of packing being somewhat variable depending upon the details of expansion design. Thereafter, in the pouring of the concrete 19 into the trench T, the concrete 19 may be poured into the chamber C wherein it flows downwardly and around the legs 22a and 22b and the bight 22c of the loop L, and also, around the fiber-glass F on each of the legs 22c and 22b, so that the concrete 19 is disposed between all portions of the loop L and the walls 20 and 20a, with the legs 22a and 22b embedded in fiber-glass F, which extends laterally in both horizontal directions therefrom, FIGS. 4 and 5. The concrete 19 in the chamber C is preferably poured to the same depth as the concrete 19 in the main body portion of the trench T, with the loop L surounded in all directions with a minimum thickness of six inches of either the concrete 19, or of both the concrete 19 and the fiber-glass F, and with the thickness of any part of the concrete 19 being not less than two inches.

With this construction, it will be seen that the fiber-glass F affords a resilient cushion for the free end portions of the legs 22a and 22b of the loop L, so that these portions of the loop L may move inwardly and outwardly relative to each other during expansion and contraction, respectively, of the pipe P. With this construction, all of the pipe P, including the loop L is afforded highly effective heat-insulation while still effectively providing for longitudinal expansion and contraction of the pipe P.

If desired, the concrete, from which the walls 20 are made, may be strutural concrete made in the usual manner, using gravel, sand, or the like. However, I prefer to use a concrete which is made from a mix which has the same volume of Portland cement and neutralized Vinsol resin as the heat-insulating concrete mix heretofore described, but which has only seven gallons of water and four cubic feet of expanded perlite instead of the twenty gallons of water and eight cubic feet of expanded perlite as in the mix for the aforementioned heat-insulating concrete.

The form of my invention shown in FIGS. 1, 2, 4 and 5, is particularly well adapted for use in areas having relatively dry, heavy soil conditions wherein the soil is sufficiently firm to afford a good form for pouring the concrete 19, and wherein little moisture is encountered in the trench T.

When pipe systems embodying my novel invention are being installed in areas having relatively loose, wet soil conditions, the modified form of my invention shown in FIG. 3 is preferably used. In FIG. 3 parts which are the same as parts shown in FIGS. 1 and 2 are indicated by the same reference numerals and parts which are similar to, but somewhat different from parts shown in FIGS. 1 and 2, are indicated by the same reference numerals with a prime mark added thereto.

Thus, in FIG. 3 a modified form of my invention is shown which is particularly well adapted for use in wet, loose soil conditions, and which includes a pipe P mounted on heat-insulating concrete blocks 17 and embedded in heat-insulating concrete 19 in a trench T. In the trench T', the walls 11 and 12 thereof are disposed further apart than are the walls 11 and 12 of the trench T shown in FIG. 1, to afford space for forms F between the walls 11 and 12 and the adjacent respective sides of the concrete 19. Also, the trench T' is somewhat deeper than the trench T and has a channel 21 extending along the longitudinal center line of the bottom thereof. Drainage tile 23 is mounted in the channel 21 and extends longitudinally thereof, and is surrounded by and is embedded in a suitable coarse aggregate such as, for example, coarse gravel or crushed stone, so that the aggregate 25 supports the tile 23 in spaced relation to the bottom and sides of the channel 21 and covers the tile 23 and the bottom 13' of the trench T' to a minimum depth of two inches. The upper surface of the gravel 25 is smoothed to thereby afford a supporting surface 27 on which the blocks 17 may be mounted.

In the construction of the pipe system shown in FIG. 3, after the trench T' has been dug, and the drainage tile 23 and the gravel 25 positioned therein, a layer of suitable waterproof sheet material 15', such as the aforementioned roofing paper, tar paper, asphalt paper, or the like, may be mounted on the upper face 27 of the gravel 25, and suitable forms S may be disposed in the trench T' in proper position therein to afford a form for the concrete 19. The blocks 17 may be disposed in proper position along the length of the trench T', and the pipe P may then be disposed in position on the blocks 17. The concrete 19 may then be poured around the pipe P and blocks 17 within the forms S, and after the concrete 19 has properly set, the forms S may be removed.

In the form of my invention shown in FIG. 3, the sheet material 15' is of only sufficient width to extend a short distance between the forms S and the bottom 13' of the trench T' on each side of the concrete 19. With this construction, after the concrete 19 has set, and the forms S have been removed from the trench T', the upper surface and the sides of the concrete 19 may be coated with a layer of tar, asphalt, or the like. However, it will be appreciated that if it is desired to do so, sheet material of the width of the sheet material 15 shown in FIG. 1 may also be used in construction of the type shown in FIG. 3, the sheet material 15 in this instance being extended upwardly of the forms S during pouring of the concrete 19 and, after the concrete 19 has sufficiently set, being folded into overlapping relation and sealed together in the manner previously described with respect to the sheet material 15 shown in FIG. 1.

It will be seen that with the trench T' constructed in the manner shown in FIG. 3, good drainage therefor is provided, the aggregate 25 and the drainage tile 23 affording drainage for moisture from the bottom of the trench T'.

Also, it will be seen that with the construction shown in FIG. 3, good pouring conditions for the concrete 19 is assured, even though the walls of the trench T' may be loose, the forms S affording suitable forms for the pouring of the concrete 19.

In some instances, my novel invention will be used to afford a pipe system in areas wherein the soil is loose but is not wet such as, for example, in dry, sandy soils.

Under such conditions, a trench which is the same as the trench T shown in FIG. 1, except that it is of the same width as the trench T', shown in FIG. 3, may be used. With this construction, the forms S of the form of my invention shown in FIG. 3 may be used, but the block 17 would rest on the flat bottom of the trench rather than on the upper surface of aggregate disposed in a trench.

In some instances it is desirable to anchor the pipes in an underground pipe system against movement at intervals along their lengths. Such construction is particularly useful in pipe systems embodying floating joint type of construction wherein it is desirable that the pipes be anchored between adjacent expansion joints. In FIGS. 6 and 7, a modified form of my invention is shown which may be utilized for so anchoring the pipe P.

In constructing a pipe system embodying the modified form of my invention shown in FIGS. 6 and 7, suitable trench, such as one like the trench T shown in FIG. 1, may be dug, with two chambers 30 and 31 afforded on opposite sides of the trench T. The chambers 30 and 31 may be of any desired cross sectional shape, the chambers 30 and 31 shown in FIGS. 6 and 7 being square in horizontal cross section, and being of such depth that they extend downwardly below the bottom 13 of the trench T, FIG. 6. The chambers 30 and 31 are filled with structural concrete 33 to such a depth that the upper surface of the concrete 33 is disposed at approximately the same height as the upper face of the concrete 19 in the trench T. Elongated supporting members or bars 35 and 36 of suitable form such as, for example, angle irons, are welded to opposite sides of the pipe P, and the ends thereof extend outwardly through the concrete 19 and are embedded in the concrete 33 in both chambers 30 and 31.

In constructing the pipe system shown in FIGS. 6 and 7, the trench T may first be dug, with the chambers 30 and 31 being dug at the same time. The pipe P, wtih the bars 35 and 36 attached thereto may be disposed in the trench T, and suitably supported in upwardly spaced relation to the bottom 13 thereof by suitable supporting means such as, for example, blocks, or the like. The openings between the chambers 30 and 31 and the main body portion of the trench T may be closed by planks or other suitable form members, not shown, and the structural concrete 33 may then be poured into the chambers 30 and 31 to the proper depth, around the free ends of the bars 35 and 36. After the concrete 33 has set, the planks or other form members, used to close the openings between the chambers 30 and 31 and the main body portion of the trench T, may be removed and the heat-insulating concrete 19 may then be poured into the main body portion of the trench T around the pipe P and around the center portions of the bars 35 and 36. After the heat insulating concrete 19 has set, the trench T, including the upper end portions of the chambers 30 and 31, may be refilled with soil previously removed therefrom.

With this construction, it will be seen that the pipe P is effectively supported and anchored by the structural concrete 33 engaged with the outer end portions of the bars 35 and 36.

The structural concrete 33 is preferably of relatively high strength, the concrete which I prefer to use for anchoring the bars 35 and 36 being of such strength that it will withstand loads of twenty-eight hundred pounds per square inch in twenty-eight day tests.

As will be appreciated by those skilled in the art, my novel invention is not limited to the use of a single pipe. Other pipes may be mounted on the blocks 17 or anchored by the bars 35 and 36. When other pipes are so disposed in my novel pipe system, I prefer that they be spaced from each other a minimum distance of two inches, and that the concrete 19 be of such dimensions that all pipes of any size be covered with a minimum thickness of concrete 19 in the order of the minimum thickness heretofore set forth with respect to pipes of various size. The blocks 17, in such multiple-pipe installations, are preferably of such width that they project longitudinally a minimum of one inch on both sides of the pipes so supported thereon.

From the foregoing it will be seen that I have afforded a novel underground or above-ground insulated pipe system which is highly efficient and effective in use, and which can be quickly and economically produced commercially.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In an underground heat-insulated pipe system including an elongated trench having a chamber projecting outwardly therefrom transversely to the length of said trench, an elongated expandible and contractible pipe mounted in said trench and extending longitudinally thereof, said pipe having an expansion and contraction loop disposed in said chamber, said loop having two spaced legs, means including heat-insulating concrete, disposed in said chamber and outwardly of said loop, and heat-insulating concrete, disposed in said chamber between said legs, for supporting said loop in said chamber, and fiber-glass stuffing mounted in said chamber between said concrete and said legs in position to normally yieldingly hold said legs in predetermined position relative to each other.

2. In an underground heat-insulated pipe system including an elongated trench having a chamber projecting outwardly therefrom transversely to the length of said trench, an elongated expandible and contractible pipe mounted in said trench and extending longitudinally thereof, said pipe having an expansion and contraction loop disposed in said chamber, said loop having two spaced legs, a structural concrete lining in said chamber disposed around said loop in spaced relation thereto, a structural concrete partition wall in said chamber disposed between said legs in spaced relation thereto, heat-insulating concrete disposed in said chamber between said lining and said loop in supporting relation to the latter, said insulating concrete extending around said legs, and fiber-glass stuffing disposed around said legs between said legs and said heat-insulating concrete in position to yieldingly resist movement of said legs toward and away from each other.

3. The combination as defined in claim 2 and in which the solid ingredients of said heat-insulating concrete consist essentially of Portland cement, expanded perlite, and the residue from an aerating agent.

4. In an underground heat-insulated pipe system including an elongated trench having enlarged chambers disposed in spaced relation to each other along said trench, elongated expandible and contractible pipe means disposed in said trench and extending longitudinally thereof, said pipe means having expansion and contraction loops at spaced intervals along the length thereof and disposed in said chambers, a plurality of supporting blocks disposed on the bottom of said trench beneath said pipe means in supporting relation to the latter, heat-insulating concrete completely enclosing said pipe means and slidingly supporting the latter between said loops, heat-insulating concrete disposed in said chambers around said pipe means in said loops in spaced relation to the latter, and resilient stuffing material consisting essentially of loosely packed fiber-glass disposed in the spaces between said last mentioned concrete and said pipe means in said loops in yielding holding relation to said loops to thereby permit expansion and contraction of said loops in said spaces.

5. In an underground heat-insulated pipe system including an elongated trench, elongated pipe means disposed in said trench and extending longitudinally thereof, said pipe means having a coating thereon, and non-yielding supporting means for said pipe, said supporting means consisting of a plurality of spaced supporting blocks disposed on the bottom of said trench beneath said pipe means in supporting relation to the latter, said blocks being made of an air-entrained heat-insulating concrete consisting essentially of perlite and Portland cement, and an air-entrained heat-insulating concrete consisting essentially of perlite and Portland cement substantially completely enclosing said pipe means and supporting said pipe means in said trench, said coating preventing said pipe means from sticking to said concrete and permitting the pipe means to expand longitudinally in slidable relation to said concrete.

6. The combination as defined in claim 5, and in which said Portland cement and said expanded perlite are present in a ratio of substantially one to eight by volume.

7. The combination as defined in claim 5, and in which said Portland cement and said expanded perlite are present in a ratio of not substantially less than one part of Portland cement to five parts of expanded perlite, by volume, and not substantially more than one part of Portland cement to nine parts of expanded perlite, by volume.

References Cited in the file of this patent

UNITED STATES PATENTS

| | | |
|---|---|---|
| 1,681,731 | Gottwald | Aug. 21, 1928 |
| 1,792,855 | McRae | Feb. 17, 1931 |
| 2,355,966 | Goff | Aug. 15, 1944 |
| 2,360,067 | McLeish | Oct. 10, 1944 |
| 2,611,567 | Williamson | Sept. 23, 1952 |
| 2,663,323 | Thomas | Dec. 22, 1953 |
| 2,707,984 | Goff | May 10, 1955 |
| 2,773,512 | Burk | Dec. 11, 1956 |
| 2,823,701 | Burk | Feb. 18, 1958 |